Figure 1:
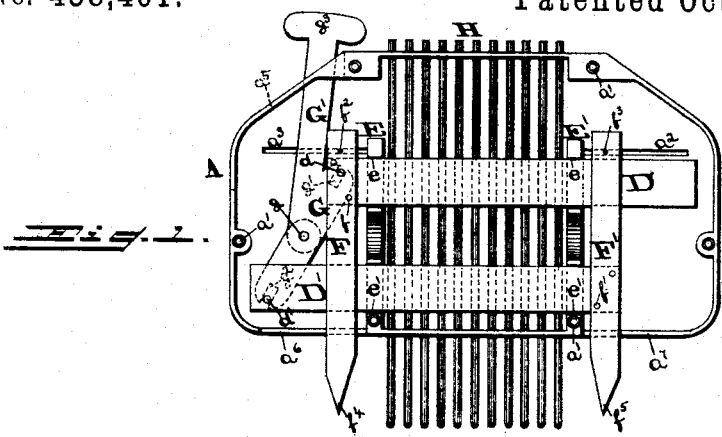

(No Model.)

D. V. BROWN.
COMBINED OPTICAL MEASURING, NOSE CONFORMING, AND RECORDING INSTRUMENT.

No. 438,401. Patented Oct. 14, 1890.

WITNESSES
George W. Dale
Oliver N. Sisson

INVENTOR
Daniel V. Brown,
By his Attorney,
Wm. De Powell.

UNITED STATES PATENT OFFICE.

DANIEL V. BROWN, OF PHILADELPHIA, PENNSYLVANIA.

COMBINED OPTICAL MEASURING, NOSE-CONFORMING, AND RECORDING INSTRUMENT.

SPECIFICATION forming part of Letters Patent No. 438,401, dated October 14, 1890.

Application filed June 17, 1890. Serial No. 355,753. (No model.)

*To all whom it may concern:*

Be it known that I, DANIEL V. BROWN, a citizen of the United States of America, residing at Philadelphia, in the county of Philadelphia and State of Pennsylvania, have invented certain new and useful Improvements in Combined Optical Measuring, Nose-Conforming, and Recording Instruments, of which the following is a specification, reference being had therein to the accompanying drawings.

My invention has for its object to provide a novel, simple, and efficient instrument or device wherewith the pupilar distance or distance between the pupils of the eyes may be accurately measured and the curvature of the crest of the nose and the height thereof relatively to the pupils of the eyes be determined, and such measurement, curvature, and height be recorded on a sheet of paper or other medium.

My invention consists in the details of construction and in the combinations of parts, as hereinafter fully described and claimed, and as illustrated in the drawings, having reference particularly to the provision of a pair of horizontally-reciprocating fingers or pointers which are brought into alignment with the pupils of the eyes through the manipulation of a single actuating-lever, and carrying each a laterally-projecting pin or point in vertical alignment with the end of said lever and at equal distances therefrom, such ends being in the same horizontal plane, as are also the pins; also, to a series of vertically-sustained loose rods with their ends normally in the same horizontal plane, and carrying each a pin or point which projects similarly to those above mentioned, such rods being free to slide upwardly when so impelled, and when such impulse is released to drop to their normal positions, so that if the nose be placed in the field of these rods their ends will rest thereon in various planes governed by the curvature of the crest thereof. So, also, will the points be in various planes correspondingly, whereupon a sheet of paper is pressed against the points on the fingers and rods, and the impressions produced thereon thereby will correctly indicate the aforementioned crest-curvature and pupilar distance, thus permitting of the perfect adjustment of the spectacles and eyeglasses to the conditions under which they are to be used.

Figure 2:
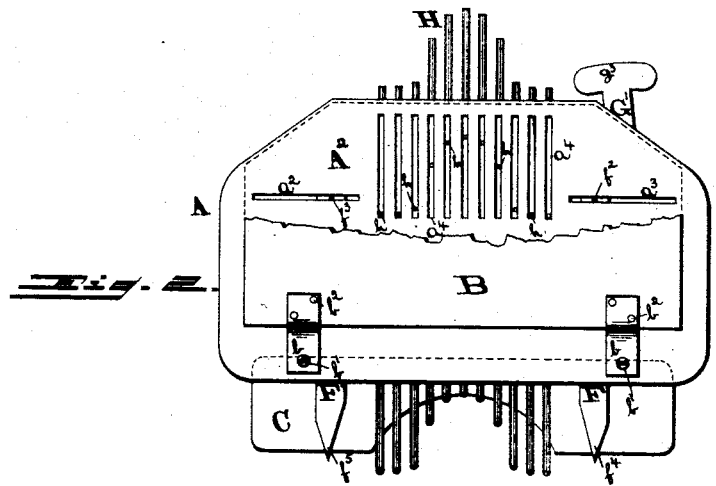
Figure 3:
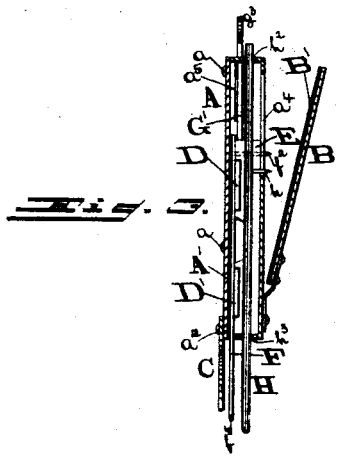

In the drawings, Figure 1 is a rear view of the complete device with the plate or cover removed from the casing. Fig. 2 is a face view of the complete device with a portion partly broken away to facilitate the illustration thereof, and Fig. 3 is an edge view of the complete device with the casing and its appurtenances in vertical transverse section.

A represents the casing, which, for compactness, is formed as shown, and is provided with the plate or cover A', secured thereto by the screws $a$, which pass into the holes $a'$ therein and the horizontally-aligned laterally-extending slots $a^2$ $a^3$ and the series of horizontally-aligned vertically-extending slots $a^4$ in its face or front $A^2$, the latter having secured thereto by the spring-metal straps $b$, through the medium of the screws $b'$, the leaf or shutter B, the latter being preferably riveted to said straps, as shown at $b^2$. This shutter may, however, be hinged to the front of the casing instead of being secured as shown in the drawings, although the latter is preferred.

C is a guard secured to the lower end of the cover A' by the screws $a^2$ and depending therefrom, said screws also serving to assist in the fastening of said cover to the casing. The casing A also has in its upper right-hand beveled portion a slot $a^5$ and in its lower edge the slots $a^6$ and $a^7$, the latter two being alike in every respect, the purposes of which slots will hereinafter appear.

D D' are a pair of horizontal bars or connections which are sustained in similarly-shaped notches $e\ e'$ in the flanges E E', preferably formed integral with the front of the casing, although the same obviously may be secured thereto instead, such notches being of such size relatively to the bars as to permit of the latter freely sliding in the former without there being, however, any too much play or lost motion.

F F' are the fingers or pointers, the former of which is secured to one end of the bar D and the last-mentioned to the end of the bar D', both of which lie in the same horizontal plane with the said bars beneath them, the effect being that the free end of the bar D merely rests beneath the upper end of the finger F' and is free to pass to and fro beneath the same, and the free end of the bar D′ merely rests beneath the lower part of the finger F and also is free to pass and repass beneath it. The mediums of securing the bars and fingers in operative relation are the rivets $f f'$.

$f^2 f^3$ are pins or points secured in the faces of the fingers F F′ in such manner that their ends will project through the slots $a^2 a^3$ and beyond the outer surface of the front of the casing for some distance, such slots affording clearance for these pins in their lateral reciprocation.

G is a link or double crank pivoted at its center on the pin $g$ on the inner side of the front $A^2$ and having in its ends the notches $g' g^2$ for the reception of the pins $d d'$ on the connections D D′. This link has formed integral therewith the arm or lever G′, with the head $g^3$ formed thereon, which is milled or roughened on its upper edge to facilitate the operation of the lever by the finger of the operator. Said link and lever obviously need not necessarily be made of one piece, but may be made of separate pieces and secured together. As will be readily understood, when the lever G is pushed in either direction—say, for instance, to the left of Fig. 1—the effect will be the movement of the upper end of the link in a like direction and the movement of the lower end thereof in the opposite direction, which movements, through the engagement of the pins $d d'$ with the notches $g' g^2$, will effect the movement of the bar D in the aforesaid left-hand direction, carrying with it the finger F, and the movement of the bar D′ in the other direction, which carries with it the finger F′. Thus the distance between the sharpened ends $f^4 f^5$ of these fingers will be thereby widened.

A movement of the lever G to the right of Fig. 1 will result in the movement of the bars D D′ and the fingers F F′, which latter project at their lower ends through the slots $a^6$ $a^7$ and for some distance below the lower edge of the casing A in directions the opposite of those above described, thus lessening the distance between the ends $f^4 f^5$ to the extent to which said lever is moved, and by reason of the fact that the pins on said fingers are in vertical alignment with said ends the distance between these pins will of course coincide with the distance between these ends.

It may be found desirable hereinafter to substitute marking devices in lieu of the pins or points on the fingers, also those on the vertical rods, thus obtaining the marking of the paper instead of the perforation or indentation thereof.

H is a series of vertical rods of uniform length and exactly alike in all respects, having therein pins or points $h$, which are like unto the pins on the fingers and project through and beyond the edges of the slots $a^4$ in the front of the casing, said slots being all alike in length and having their ends in the same horizontal planes. These pins or points are all the same distance from the lower ends of the rods, which ends are slightly rounded, as shown, so that when the rods are in the positions illustrated in Fig. 1 the pins $h$ will rest on the bottoms of the slots $a^4$, and thus limit the downward movement of the rods, the latter being guided and maintained vertically in the openings $h^2 h^3$ in the top and bottom of the casing A, in which openings they have freedom of vertical movement. The upward movement of the rods is limited by the contact of the pins $h$ with the tops of the slots $a^4$. By reason of the fact that the pins $h$ are all the same distance from the lower ends of the rods in which they are secured the pins will always bear the same relation to each other as the lower ends of the rods do to their neighbors, so that when the rods are in the positions shown in Fig. 2, which positions are those assumed when a nose of a certain curvature is placed within the concavity $c$ in the guard C, causing the forcing upward of some of the rods by the contact of their lower ends with such nose, the pins on such rods as are pushed up will be in the same relative positions as the said lower ends, and will by such positions indicate the aforesaid curvature.

The operation is as follows: The instrument is placed with the back of the casing toward the face of the person for whom the glasses are intended and in such position that his nose will project within the boundary of the concavity $c$ to such extent that the lower ends of the rods will contact with the crest of the nose at the point where the bridge of the spectacles is to rest, thus bringing the pins on such rods in a corresponding position, whereupon the lever G, which projects through the slot $a^5$ and is limited in its movements by the ends thereof, is pushed in the proper direction to bring the ends $f^4 f^5$ into alignment with the pupils of the eyes, the pins $f^2 f^3$ also being, consequently, the same distance apart as the said ends. Then the leaf or shutter B is pressed against the sharp ends of the pins on the fingers and the rods, said leaf having a lining of cloth or other yielding material, as at B′, which allows the points to pass through the paper, which is inserted between said lining and said pins, and perforate the same, thus recording the exact distance between the eyes as measured by the ends of the fingers and the curvature of the crest of the nose as lined out by the lower ends of the rods. At the same time the cloth prevents the injury of the sharp points of the pins which would result from their contact with the metal composing the leaf or shutter, the spring-metal straps, which secure the latter to the casing, also serving to return the same to its normal position upon the completion of the operation.

What I claim as my invention is as follows:

1. In a combined optical measuring, nose-conforming, and recording instrument, the combination of a series of vertically-movable rods, a pin or marker on each rod in vertical alignment with the end thereof, and means for bringing a sheet of paper into contact with said pins or markers, for the purpose specified.

2. In a combined optical measuring, nose-conforming, and recording instrument, the combination of a pair of pointers laterally movable in opposite directions, a series of vertically-movable rods, a pin or marker on each pointer and rod in vertical alignment with the end thereof, and means for bringing a sheet of paper into contact with said pins or markers, for the purpose specified.

3. In a combined optical measuring, nose-conforming, and recording instrument, the combination of a pair of pointers laterally movable in opposite directions, a pin or marker on each pointer in vertical alignment with the end thereof, and a hinged shutter provided with a yielding lining and adapted for the reception of a sheet of paper and placing of the same into contact with the pins or markers, for the purpose specified.

4. In a combined optical measuring, nose-conforming, and recording instrument, the combination of a series of vertically-movable rods, a pin or marker on each rod in vertical alignment with the end thereof, and a hinged shutter provided with a yielding lining and adapted for the reception of a sheet of paper and placing of the same into contact with the pins or markers, for the purpose specified.

5. In a combined optical measuring, nose-conforming, and recording instrument, the combination of a pair of pointers laterally movable in opposite directions, a series of vertically-movable rods, a pin or marker on each pointer and rod in vertical alignment with the end thereof, and a hinged shutter provided with a yielding lining and adapted for the reception of a sheet of paper and placing the same into contact with the pins or markers, for the purpose specified.

6. In a combined optical measuring, nose-conforming, and recording instrument, the combination of a casing, the pointers F F', the pins $f^2 f^3$, projecting through slots in the casing, the bars D D', secured to the pointers and sliding in ways in said casing, and means for placing a sheet of paper into contact with the pins, substantially as specified.

7. In a combined optical measuring, nose-conforming, and recording instrument, the combination of a casing, the pointers F F', the pins $f^2 f^3$, projecting through slots in the casing, the bars D D', secured to the pointers and sustained in ways in said casing, the link G, the notches $g' g^2$, the pins $d\ d'$, the lever G', integral with or secured to the link, the pin $g$ for the support of the latter, and means for placing a sheet of paper into contact with the pins, substantially as specified.

8. In a combined optical measuring, nose-conforming, and recording instrument, the combination of a casing, a series of rods H, adapted to slide vertically in the casing, the pins $h$ on said rods and projecting through vertical slots in said casing, and means for placing a sheet of paper into contact with the pins, substantially as specified.

9. In a combined optical measuring, nose-conforming, and recording instrument, the combination of a casing, the pointers F F', the pins $f^2 f^3$, projecting through slots in the casing, the bars D D', secured to the pointers and sustained in ways in said casing, the link G, the notches $g' g^2$, the pins $d\ d'$, the lever G', integral with or secured to the link, the pin $g$ for the support of the latter, a series of rods H, adapted to slide vertically in the casing, the pins $h$ on said rods and projecting through vertical slots in said casing, and means for placing a sheet of paper into contact with the pins, substantially as specified.

10. In a combined optical measuring, nose-conforming, and recording instrument, the combination of the casing A, provided with the slots $a^2 a^3 a^4 a^5 a^6 a^7$, the flanges E E', having therein the notches $e\ e'$, the bars D D', the pointers F F', secured to the bars, the pins $f^2 f^3$ in the slots $a^2 a^3$, the pins $d\ d'$, the link G, with the notches $g' g^2$ in engagement with the pins $d\ d'$, the pin $g$, supporting the link, the lever G', integral with or secured to the latter, the rods H, sustained in the openings $h^2 h^3$, the pins $h$ on said rods and projecting through the slots $a^4$, the shutter B, provided with the lining B', the straps $b$, secured to said shutter and the casing, and the guard C, substantially as specified.

In testimony whereof I affix my signature in presence of two witnesses.

DANIEL V. BROWN.

Witnesses:
R. DALE SPARHAWK,
WM. H. POWELL.